April 21, 1953        J. H. HAMPTON        2,635,734
CONTINUOUS FLOW FLIGHT CONVEYER
Filed March 23, 1951        2 SHEETS—SHEET 1
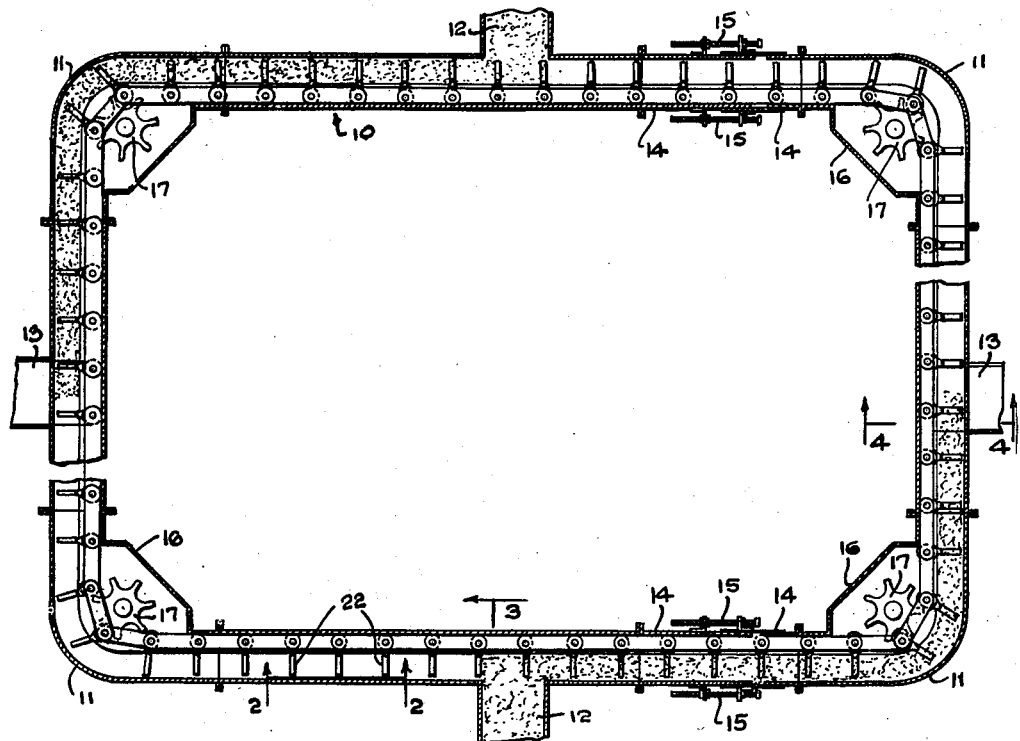
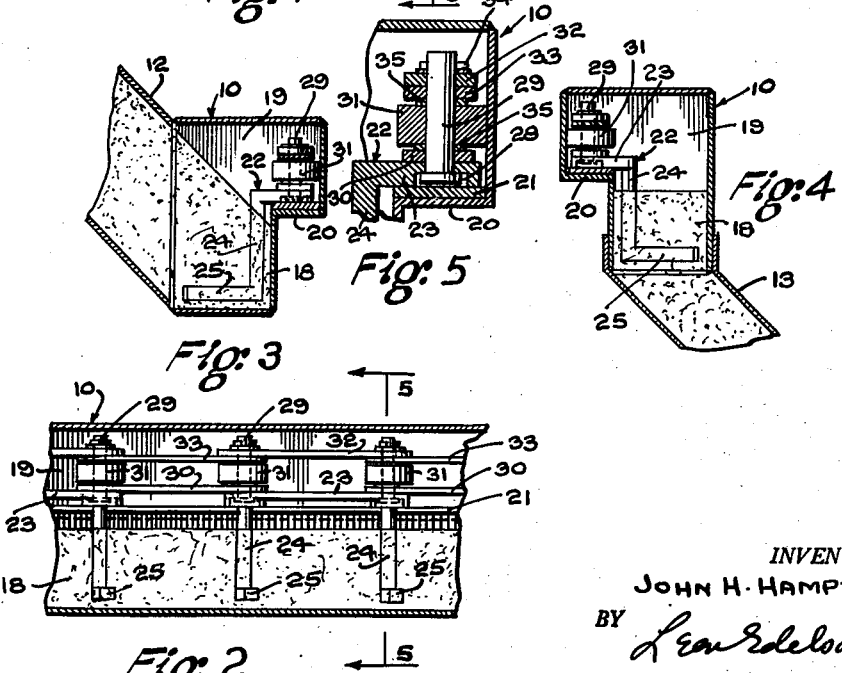
INVENTOR.
JOHN H. HAMPTON
BY
Attorney April 21, 1953  J. H. HAMPTON  2,635,734
CONTINUOUS FLOW FLIGHT CONVEYER
Filed March 23, 1951  2 SHEETS—SHEET 2

INVENTOR.
JOHN H. HAMPTON
BY Leo Edelson
Attorney

Patented Apr. 21, 1953

2,635,734

UNITED STATES PATENT OFFICE 2,635,734

CONTINUOUS FLOW FLIGHT CONVEYER

John H. Hampton, Oaklyn, N. J., assignor to Beaumont Birch Company, Philadelphia, Pa.

Application March 23, 1951, Serial No. 217,175

2 Claims. (Cl. 198—171)

1

The present invention relates generally to the art of material handling and more particularly to a conveyor for moving flowable solid material in a continuous stream.

Among the principal objects of the present invention is to provide an improved endless conveyor operating within a conduit to convey flowable solid material, such as coal or the like, in a horizontal plane from one or more points of material supply to one or more points of material discharge, the conveyor being of such articulated construction that it may be efficiently employed to move the material along curvilinear as well as rectilinear paths.

A further object of the invention is to provide a conveyor of the character described in which the material moving means comprises a plurality of flight units linked together, each of said units having a pair of sweep arms rigidly secured at opposite ends of a connecting member which is adapted to form a portion of an endless conveyor chain. Furthermore, the invention provides flight units which are so constructed that each of its sweep arms is disposed in a vertical plane which extends at right angles to the direction of travel of the material.

It is a still further object to provide a conveyor of the character described in which rollers are adapted to be incorporated in the conveyor chain to facilitate its travel through a fixed conduit in which the material is caused to flow, these rollers being engageable with the conventional sprockets employed for driving the chain.

Still another and important object of the invention is to provide a conveyor of the character aforesaid wherein the conduit which determines the direction of flow of the material is compartmentalized to effectively separate the interior of the material-conveying section of the conduit from the chain-housing section thereof, thereby insuring not only against untoward crushing and degradation of the material being handled but also against excessive and premature wear of the conveyor chain itself such as might result from any abrasive action of the material upon the chain. Also, by so separating the chain portion of the conveyor from its material-contacting portion clogging of the chain by the material is substantially avoided with resulting increase in its operating efficiency.

Other objects and advantages of the present invention will appear more fully hereinafter, it being understood that the invention consists substantially in the combination, construction, location and relative arrangement of parts, all as described in detail hereinafter, as shown in the accompanying drawings and as finally pointed out in the appended claims.

In the accompanying drawings which are illustrative of certain preferred embodiments of the present invention:

Figure 1 is a top plan view of a conveyor, embodying the present invention, the material-conveying conduit being shown with its top cover plate removed;

Figure 2 is a vertical sectional view of a portion of the conveyor as taken along the line 2—2 of Figure 1;

Figure 3 is a transverse sectional view of the conveyor as taken on the line 3—3 of Figure 1 showing a material receiving inlet;

Figure 4 is a transverse sectional view of the conveyor as taken on the line 4—4 of Figure 1 showing a material discharging outlet;

Figure 5 is an enlarged transverse sectional view of the upper portion of the conveyor as taken on the line 5—5 of Figure 2 showing in particular the roller link chain arrangement;

Figure 9:
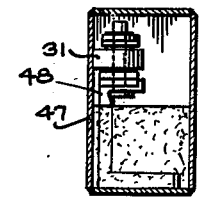
Figure 10:
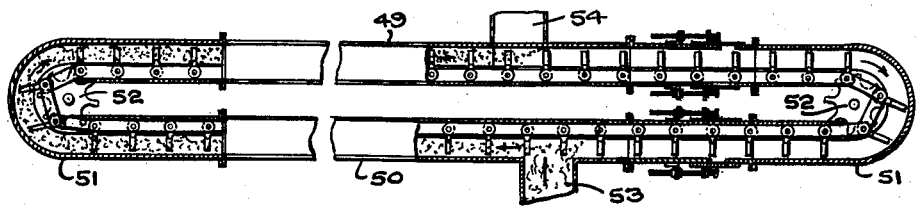

Figure 9 is a cross sectional view of a further modified form of conveyor in which the conveyor chain and the material being handled course through a single compartment conduit; and Figure 10 is a top plan view of a conveyor of the so-called two way type wherein the material is moved in opposite directions through a pair of closely related parallel conduits which are connected at their ends for recirculation of the material which might happen to pass a given discharge outlet.

In general, the conveyor of the present invention is of the type in which the flowable solid material is conveyed through a trough portion of a suitable casing or conduit arranged in the form of a closed circuit by means of a continuous conveying chain of interconnected material-moving flights arranged to travel within the casing or conduit. In the embodiment of the invention as illustrated in Figure 1, the conveyor is provided with a casing or conduit 10, disposed in a horizontal plane and forming a closed circuit of generally rectangular form, the several side portions of the conduit being respectively interconnected by curved sections 11 to provide an endless material-conveying conduit. This conduit 10, which is made up of sections suitably joined together, may be provided along its oppositely disposed sides with inlet or feed openings 12—12 and outlet or discharge openings 13—13. It will be understood that the number and locations of the openings along the conduit are determined by the points between which it is desired to transfer the material.

In the present arrangement of Figure 1, the material enters the conduit at opposite sides thereof, as at 12—12 and is conveyed through the conduit in a counterclockwise direction for discharge therefrom at one or both of the discharge openings 13—13, these latter being located at any suitable point along the lengths of the conduit which extend between the opposed inlet portions thereof.

The conduit 10 is preferably provided, along each length thereof from which the material discharges, with telescoping sections 14—14 which are adapted to be adjusted lengthwise by suitably mounted adjusting screws 15—15 to increase or decrease the overall conduit length as may be required to properly position the conveyor chain therein.

The curved corner sections 11 of the conduit are each provided with an interiorly disposed housing 16 within which a suitable sprocket 17 is mounted, at least one of which latter is power driven, to guide and to move the conveying chain along the conduit. The conduit may be provided along its upper surface with one or more removable cover plates for access to the interiorly disposed conveyor chain.

As is most clearly shown in Figures 3 and 4, the conduit 10 is generally of inverted L-shape in transverse cross-section to provide it with a bottom section in the form of a continuous trough 18 in which the material is received and through which it is moved along its enclosed course and with an upper section 19 through which the conveyor chain courses, this upper section of the conduit being in the form of a compartment somewhat wider than the trough to provide a laterally offset ledge or shelf 20 for supporting the conveyor chain for movement in a horizontal plane spaced vertically above the upper level of the material contained in the trough. Preferably, the chain supporting ledge 20 is provided with a wear-resisting steel liner 21 which extends about the full length of the conduit.

Figure 6:
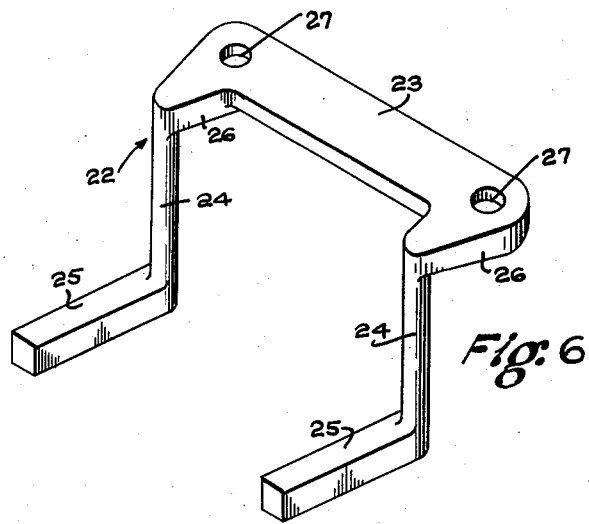
Figure 6 is a perspective view showing a flight unit as constructed in accordance with the present invention.

The material conveying chain is itself made up of a plurality of link-connected unitary flights 22 each of the construction shown in Figure 6. It will be noted that each flight member 22 comprises a flat bar 23 from the opposite ends of which respectively depend a pair of vertically extending, parallel members 24—24 terminating at their lower ends in horizontally extending sweep arms 25—25. Each depending member 24 and its integral sweep arm 25 forms an L-shaped flight element which is integrally united to the upper supporting bar 23 and is disposed in a vertical plane, the sweep arms 25—25 being themselves disposed in a common horizontal plane spaced vertically below that of their supporting bar 23. Preferably, the sweep arms 25—25, which are parallel to one another, respectively extend at a slight angle to the transverse median plane of the flight member 22 of which they form integral elements, the angular relation of said sweep arms with respect to their line of travel being such that they provide a slight shearing effort upon the material as the conveyor chain traverses its endless course through the conduit. The supporting bar 23 is thickened at its opposite ends, as at 26—26, to provide relatively strong connecting portions for the depending flight elements and to provide spaced bosses for slidably supporting the length bar upon the ledge 20 of the conduit with the major intermediate length of the bar out of contact with said ledge. These bearing bosses 26—26 are respectively provided with apertures 27—27 which are each countersunk at their bottom ends, as at 28, best shown in Figure 5, to provide recesses for flush accommodation of the beaded ends of pins 29 employed to pivotally connect together the several links of the conveyor chain.

The unitary flights 22 are designed for assembly with intervening links to form an endless chain conveyor operative within the conduit to move the material therein. To this end, successive pairs of the flights 22 are joined together in longitudinally spaced relation by an intervening link 30 the opposite ends of which are suitably apertured to permit the projection therethrough of the upwardly projecting pivot pins 29, each said link 30 resting directly upon and extending between proximate ends of the flat upper bars 23 of a spaced pair of flights 22. The flight bars 23 and their interconnecting links 30 thus constitute the bottom linked section of the conveyor chain.

Each pivot pin 29 is fitted with a revoluble roller 31 which rests upon an end of each link 30, the roller-fitted pins 29 being then interconnected by a series of links 32—33 arranged in alternating relation to form the upper linked section of the conveyor chain. It will be noted that the links 32 are disposed immediately above and in registry with the flight bars 23, while the links 33 are disposed in vertically spaced registry with the links 30, the rollers 31 being thus secured between the upper and lower sections of the chain conveyor for interengagement with the conventional sprockets 17, at least one of which is power driven to move the conveyor chain along its endless course of travel. The several parts which form the conveyor chain as just described are held together upon the pivot pins 29 by any suitable means, preferably cotter pins 34 projected through the outer ends of the pivot pins. Preferably, the rollers 31 are spaced from links 30 and 33 by intervening washers 35.

As most clearly appears in Figures 3 to 5, the flights 22 of the present invention, which form component parts of the conveyor chain, extend downwardly into the trough 18 of the conduit to present their sweep arms 25—25 in close relation to the bottom of the trough. As the chain conveyor traverses its course through the conduit, these arms 25—25 sweep through the material in the trough 18 and cause it to move along the conduit to the point of its discharge therefrom, with such material as happens to pass the discharge opening being recirculated through the conduit until it is finally discharged. The conveyor chain itself is slidably supported upon the ledge 20, which is laterally offset from and vertically spaced above the level of the material conveyed through the conduit and maintains the conveyor chain out of direct contact with the material, thus not only preventing premature wear and clogging of the chain by contact therewith of the material being handled, but also eliminating such contamination and degradation of the material as normally results from direct contact of the chain with the material.

Figure 7:
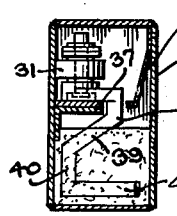
Figure 7 is a cross sectional view of a modified form of conveyor having separate compartments for the material and for the link chain.

In the modified form of the invention shown in Figure 7, the material conveying conduit 36 is of rectangular shape in transverse cross-section and is interiorly provided with a horizontally disposed shelf or ledge 37 adapted to support thereon the articulated link section of the material conveying chain, this ledge being disposed directly above the level of the material in the conduit to divide it into a pair of vertically spaced portions, the lower of which receives the material to be conveyed and the upper of which houses the chain section of the conveyor.

The free edge of the chain-supporting ledge 37 is spaced from the outer wall of the conduit 36 sufficiently to permit the downward projection of the flight units 38 into the conduit section which receives the material to be handled, it being noted that in this modified construction each of the flights includes a depending member 39 having an inwardly offset part 40 terminating in a horizontally extending sweep arm 41. By virtue of the offset 40 the sweep arms are disposed directly below the chain-supporting ledge 37. If desired, to further seal off the upper section of the conduit which houses the conveyor chain from the lower section thereof containing the material being conveyed, a supplemental partition member 42 may be provided as shown to close the gap between the conduit outer wall and the portions of the flights which extend downwardly across the edge of the ledge 37. Except for the variation in shape of the depending portions of the flights, each of the latter is of the unitary construction above described having a pair of flight elements integral with an interconnecting bar designated for inclusion as a link element of the conveyor chain.

Figure 8:
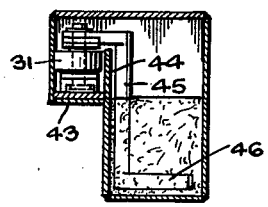
Figure 8 is a cross sectional view of another modified form of conveyor having separate compartments.

In the modified form of the invention shown in Figure 8, the conduit is of the same general shape as that shown in Figures 1 to 5 having a chain supporting ledge 43 offset laterally from the lower material receiving section of the conduit. This ledge is, however, provided with an upstanding rib member 44 to provide a more enclosed section for the conveyor chain. In general, the conveyor chain assembly is similar to that shown in Figures 1 to 5, except that the flights are each provided with longer supports 45 for the sweep arms 46 and are so disposed that their upper flat bar portions constitute component elements of the upper rather than the lower linked section of the chain.

In the modified construction of the invention as shown in Figure 9, the conduit 47 is of simple rectangular cross-section to provide a single enclosure for the chain conveyor and for the material moving through the conduit. In this construction, as in that of Figures 1 to 5, the flights 48 each include flat top bars which are incorporated in the conveyor chain as interconnected links thereof, each such bar having a depending pair of L-shaped flight elements integrally united to the bar. The flights of Figure 9 differ, however, from those of Figures 1 to 6 in that the top bar thereof and their lower sweep arms are not laterally offset but instead are substantially in vertical alinement, thus providing flight units of relatively narrow overall dimension. Also, these flight units and the conveyor chain of which they form a part, as shown in Figure 9, rest upon and are supported more or less directly by the floor of the conduit as the chain courses therethrough, thus providing a relatively inexpensive construction of continuous flow conveyor utilizing the flights of the present invention.

While as shown in Figure 1 the conveyor conduit is generally in the form of an open rectangle having curved corners, it will be understood that the conduit may take other forms, such as that shown in Figure 10 wherein the material moves in opposite directions along closely adjacent parallel paths 49—50 which are connected together at their corresponding ends by U-shaped sections 51—51 within the bights of which are located the sprockets 52—52 which engage the endless conveyor chain and drive it in conventional manner through the conveyor conduit. This so-called 180 degree type of continuous flow conveyor is provided with one or more material inlet chutes 53 along one of its elongated sides and with one or more discharge chutes 54 suitably located along the opposed side thereof. As in the form of conveyor previously described, the flights, which are incorporated as elements of the conveyor chain, are of the general construction shown in Figure 6, each being characterized by the provision of a flat bar forming a chain link and having integrally formed L-shaped flight elements at opposite ends thereof which project into the material-conveying chute and sweep through the material to cause it to flow through the conveyor conduit for discharge therefrom at any desired point in the closed circuit of the conveyor. These flights are readily incorporated into the conveyor chain to make up a chain of any desired length and are just as easily removed for purposes of replacement and for such other servicing of the conveyor as may be required.

It will be understood, of course, that the present invention is susceptible of various changes and modifications which may be made from time to time without departing from the general principles or real spirit of the present invention, and it will be understood accordingly that it is intended to claim the same broadly, as well as specifically, as indicated by the appended claims.

What is claimed as new and useful is:

1. In a continuous flow conveyor for conveying flowable solid material, a conduit providing an endless trough in its lower portion within which said material is adapted to be moved, and an endless chain traversable through said conduit to move said material, said chain comprising a plurality of paired link members, the members of each pair being disposed in vertically spaced relation, pivot pins projected through alined apertures in corresponding ends of said members for interconnecting adjacent pairs thereof, roller members on said pins, said roller members being positioned between said vertically spaced link members and being adapted for interengagement with toothed sprocket wheels operative to guide and drive said chain, certain of said lower link members being slidably supported upon a horizontally extending supporting surface presented by said conduit, being provided at opposite ends with integral laterally offset L-shaped flight element appendages projecting downwardly therefrom into said trough for engaging said material, and being essential elements of said chain, said flight element appendages being uniformly spaced apart along the length of the chain by the pitch distance thereof.

2. In an endless chain for a continuous flow conveyor for flowable solid material, said chain comprising a plurality of paired link members, the members of each pair being disposed in vertically spaced relation, pivot pins projected through alined apertures in corresponding ends of said members for interconnecting adjacent pairs thereof, roller members on said pins, said roller members being positioned between said vertically spaced link members, and being adapted for interengagement with toothed sprocket wheels operative to guide and drive said chain, alternate lower link members being provided at opposite ends with integral depending L-shaped flight element appendages disposed in laterally offset relation thereto and being essential elements of said chain, said flight element appendages being uniformly spaced apart by the pitch distance of the chain along the length thereof.

JOHN H. HAMPTON.

References Cited in the file of this patent

UNITED STATES PATENTS

| Number | Name | Date |
|---|---|---|
| 2,164,124 | Slater | June 27, 1939 |
| 2,292,793 | Sinden | Aug. 11, 1942 |
| 2,366,569 | Sinden | Jan. 2, 1945 |

FOREIGN PATENTS

| Number | Country | Date |
|---|---|---|
| 6,011 of 1910 | Great Britain | Dec. 15, 1910 |